(12) United States Patent
Teetzel et al.

(10) Patent No.: US 8,739,313 B2
(45) Date of Patent: Jun. 3, 2014

(54) HELMET MOUNTING SYSTEMS

(75) Inventors: James W. Teetzel, York, ME (US); Gary M. Lemire, Lee, NH (US); Marc J. Celona, Dover, NH (US)

(73) Assignee: Wilcox Industries Corp., Newington, NH (US)

( * ) Notice: Subject to any disclaimer, the term of this patent is extended or adjusted under 35 U.S.C. 154(b) by 382 days.

(21) Appl. No.: 12/951,969

(22) Filed: Nov. 22, 2010

(65) Prior Publication Data

US 2011/0145981 A1 Jun. 23, 2011

Related U.S. Application Data

(60) Provisional application No. 61/263,159, filed on Nov. 20, 2009.

(51) Int. Cl.
*F41H 1/04* (2006.01)
(52) U.S. Cl.
USPC .................................... 2/6.6; 2/422
(58) Field of Classification Search
USPC ............ 2/6.1, 6.2, 6.6, 422, 209.13; 359/409, 359/815; 224/181, 182, 908, 909
See application file for complete search history.

(56) References Cited

U.S. PATENT DOCUMENTS

| | | | |
|---|---|---|---|
| 4,156,292 A | 5/1979 | Helm et al. | |
| 4,242,757 A | 1/1981 | Nava | |
| 4,449,787 A | 5/1984 | Burbo et al. | |
| 4,577,347 A | 3/1986 | Connon | |
| 4,660,943 A | 4/1987 | Ellis | |
| 4,689,834 A * | 9/1987 | McCarthy et al. | 2/6.2 |
| 4,901,210 A | 2/1990 | Hanabusa | |
| 4,987,608 A | 1/1991 | Cobb | |
| 5,265,276 A * | 11/1993 | Kimberly, Jr. | 2/6.2 |
| 5,367,402 A | 11/1994 | Holmes et al. | |
| 5,408,086 A | 4/1995 | Morris et al. | |
| 5,412,811 A | 5/1995 | Hildenbrand et al. | |

(Continued)

FOREIGN PATENT DOCUMENTS

| | | |
|---|---|---|
| FR | 2677604 A1 | 12/1992 |
| GB | 2470831 A | 12/2010 |
| WO | WO 2006065805 A2 * | 6/2006 ........................ 2/422 |

OTHER PUBLICATIONS

U.S. Appl. No. 12/117,704, filed May 8, 2008.

(Continued)

*Primary Examiner* — Clinton T Ostrup
*Assistant Examiner* — Andrew W Sutton
(74) *Attorney, Agent, or Firm* — McLane, Graf, Raulerson & Middleton, Professional Association (57) ABSTRACT

Helmet mounts for mounting an associated viewing device on a helmet, includes a first pivoting segment for attachment to the helmet and a second pivoting segment for attachment to the associated viewing device. The second pivoting segment is pivotable relative to the first pivoting segment for selectively supporting the associated viewing device in a first, operational position before the eyes of a user donning the helmet and a second, stowed position above a line of sight of a viewer donning the helmet. In one aspect, the first pivoting segment includes a vertical adjust mechanism having a base plate, a pair of guide rails attached to the base plate and defining a channel therebetween, a sliding plate slidably attached to the guide rails, and a clamping mechanism for selectively applying a clamping force to secure the sliding plate at a desired position relative to the base plate.

6 Claims, 12 Drawing Sheets

(56) References Cited

U.S. PATENT DOCUMENTS

| | | |
|---|---|---|
| 5,416,922 A | 5/1995 | Horvat et al. |
| 5,467,479 A | 11/1995 | Mattes |
| 5,471,678 A | 12/1995 | Dor |
| 5,506,730 A | 4/1996 | Morley et al. |
| 5,535,053 A | 7/1996 | Baril et al. |
| 5,542,627 A | 8/1996 | Crenshaw et al. |
| 5,581,806 A | 12/1996 | Capdepuy et al. |
| 5,703,354 A | 12/1997 | Wannagot et al. |
| D392,071 S | 3/1998 | Berke |
| D402,421 S | 12/1998 | Berke |
| 5,898,472 A | 4/1999 | Oshikawa |
| 5,914,816 A | 6/1999 | Soto et al. |
| 5,920,371 A * | 7/1999 | Chang et al. ............... 351/158 |
| 6,457,179 B1 * | 10/2002 | Prendergast .................. 2/6.2 |
| 6,462,867 B2 | 10/2002 | Choinere |
| 6,472,776 B1 | 10/2002 | Soto et al. |
| 6,560,029 B1 | 5/2003 | Dobbie et al. |
| 6,662,370 B1 | 12/2003 | Buchanan, Jr. |
| 6,795,977 B2 | 9/2004 | Basson et al. |
| 6,957,449 B2 | 10/2005 | Prendergast |
| 7,219,370 B1 * | 5/2007 | Teetzel et al. ................. 2/6.2 |
| 7,418,738 B2 * | 9/2008 | Prendergast .................... 2/22 |
| 7,735,159 B2 | 6/2010 | Prendergast |
| 2002/0120979 A1 | 9/2002 | Prendergast |
| 2005/0111097 A1 | 5/2005 | Iannarelli et al. |
| 2007/0012830 A1 * | 1/2007 | Prendergast ................ 248/200 |
| 2007/0212930 A1 * | 9/2007 | Gruebel et al. ............. 439/500 |
| 2007/0214551 A1 * | 9/2007 | Teetzel et al. ................. 2/422 |
| 2008/0263752 A1 * | 10/2008 | Solinsky et al. .............. 2/422 |
| 2010/0299814 A1 | 12/2010 | Celona et al. |

OTHER PUBLICATIONS

U.S. Appl. No. 12/259,010, filed Oct. 27, 2010.
U.S. Appl. No. 12/759,435, filed Apr. 13, 2010.
U.S. Appl. No. 13/019,889, filed Feb. 2, 2011.

\* cited by examiner

HELMET MOUNTING SYSTEMS

CROSS-REFERENCE TO RELATED APPLICATION

This application claims the benefit of priority under 35 U.S.C. §119(e) based on U.S. Provisional Application No. 61/263,159. The aforementioned application is incorporated herein by reference in its entirety.

INCORPORATION BY REFERENCE

This application is related to U.S. provisional application No. 60/509,136 filed Oct. 6, 2003; U.S. application Ser. No. 10/959,906 filed Oct. 6, 2004 now U.S. Pat. No. 7,219,370; U.S. application Ser. No. 11/804,813 filed May 21, 2007; U.S. provisional application No. 60/928,239 filed May 8, 2007; U.S. application Ser. No. 12/117,704 filed May 8, 2008; U.S. application Ser. No. 12/259,010 filed Oct. 27, 2008; and U.S. provisional application No. 61/168,789 filed Apr. 13, 2009. Each of the aforementioned applications is incorporated herein by reference in its entirety.

BACKGROUND

The present disclosure relates to an improved system for mounting an optical device to headgear such as a field helmet. Although the mounting systems of the present disclosure can be used with all manner of viewing devices, they are particularly suited for use with a night vision goggle or other device enabling effective viewing under night time or other low light conditions.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
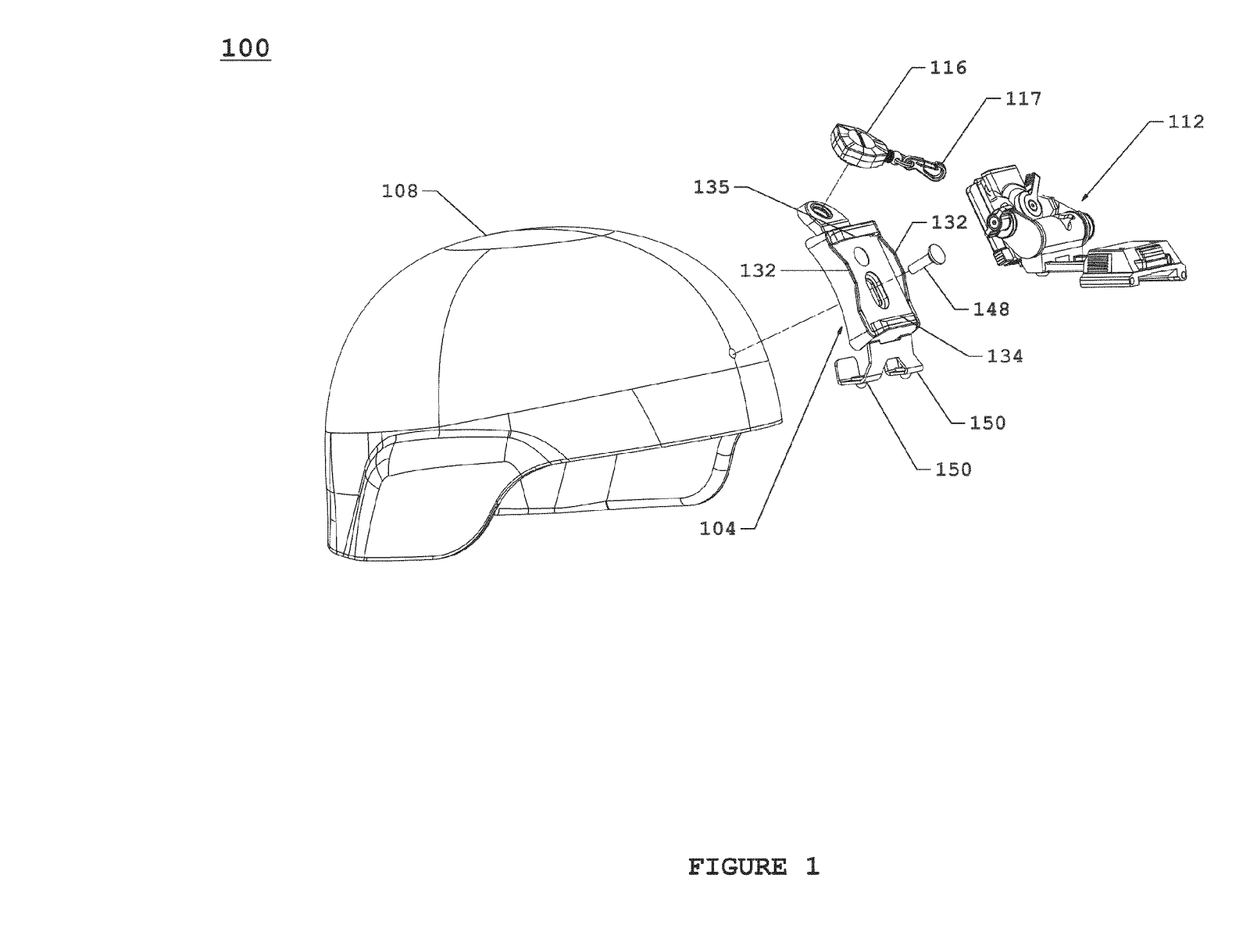
FIG. 1 is a partially exploded isometric view taken from the front side of a helmet having a helmet mount system according to a first exemplary embodiment.

Referring now to the drawing FIGURES, wherein like reference numerals refer to like or analogous components throughout the several views, and with particular reference to FIG. 1, there appears a first exemplary helmet mounting system embodiment 100 of the present invention. The helmet mounting system 100 includes a connection plate assembly 104 attached to the front portion of a helmet 108. A pivoting helmet mount assembly 112 is removably attached at a first end to the connection plate 104 and includes a second end adapted to be removably attached to a viewing or sighting device (not shown), such as an optical device, monocular or binocular night vision goggle, binoculars, helmet mounted display screen, head-up display or any other helmet mounted optical, electro-optical or other viewing device.

The mounting plate 104 couples to the helmet 108 utilizing a mechanical fastener 148 such as a threaded fastener or the like. Also, a pair of laterally spaced-apart hook members 150 engages the brim of the helmet, thereby providing three points of attachment of the mounting plate 104. Commonly, military helmets are provided with a single hole predrilled in the front thereof and the embodiment 100 is advantageous in that it may readily be adapted to employ such a predrilled hole for receiving the fastener 148.

The helmet mounting system 100 also includes an optional lanyard 116 which may be secured to the bracket 104 via an optional lanyard interface on the bracket 104. The lanyard 116 may include a clip 117 for removable attachment to an attached optical device and an extendable/retractable cord or cable. While the lanyard and lanyard interface are optional, the use of a lanyard may be advantageous in preventing damage to the optical device, not shown, in the event it becomes disengaged from the helmet mount 112.

Figure 2:
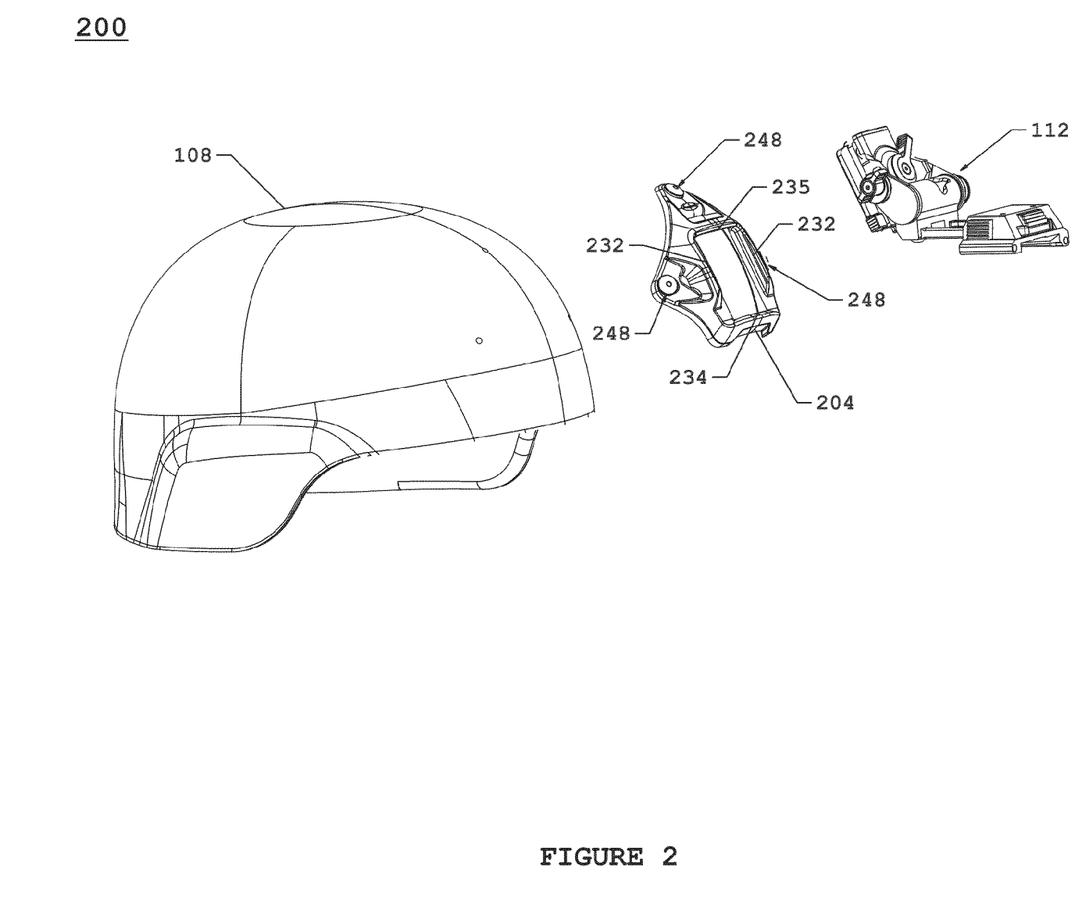
FIG. 2 is a partially exploded isometric view taken from the front side of a helmet having a helmet mount system according to a second exemplary embodiment.

Referring now to FIG. 2, there appears an alternative exemplary helmet mounting system embodiment 200 of the present invention. The helmet mounting system 200 includes a connection plate assembly 204 attached to the front portion of a helmet 108. A pivoting helmet mount assembly 112 is removably attached at a first end to the connection plate 204 and has a second end for attachment to a sighting device, not shown. The mounting plate 204 couples to the helmet 108 utilizing mechanical fasteners 248, such as screws, rivets, clips, dogs, pawls, or the like.

The purpose of the mounting systems herein is to position a sighting device so that it is movable between an operational or viewing position in front of an eye or eyes of the user, and a stowed position above the line of sight of the user, thereby allowing the operator to reposition the sighting device without the need to remove the helmet or to remove the viewing device from the mount.

Figure 3A:
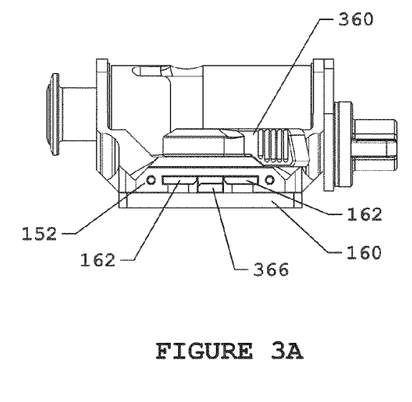
FIG. 3A is an enlarged, partially exploded front perspective view of the mounting assembly 112 shown in FIGS. 1 and 2.
Figure 3B:
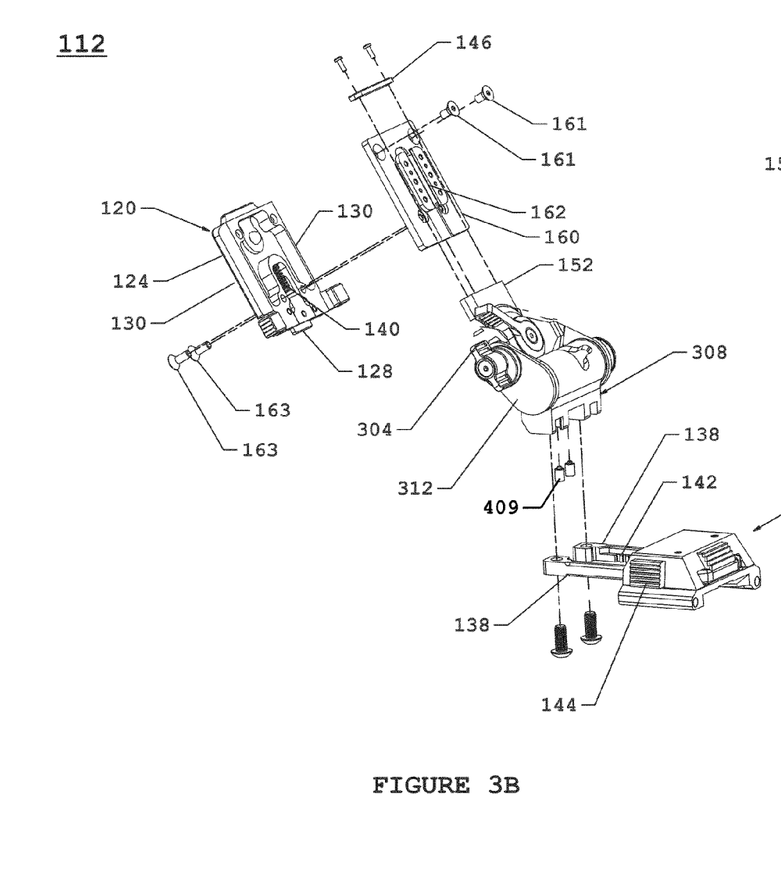
FIG. 3B is an end view of the mounting assembly 112 shown in FIGS. 1 and 2.

With reference now to FIGS. 3A and 3B, and with continued reference to FIGS. 1 and 2, the pivoting helmet mount assembly 112 includes a helmet interface assembly 120 that interfaces with the mounting plates 104 (see FIG. 1) or 204 (see FIG. 2). The mounting plates 104 and 204 contain guide rails 132 and 232, a first opening, e.g., defined by lower groove lips 134 and 234, and a second opening, e.g., defined by upper groove lips 135 and 235, respectively. The mounting assembly 120 embodiment shown in FIGS. 3A and 3B includes a base member 124 and has a vertical adjust plate assembly 160 secured thereto, e.g., via fasteners 161 and 163. The base member 124 includes a locking tongue 128 and side walls 130. The side walls 130 mate with guide rails 132 and 232 formed on plates 104 and 204, respectively. A locking tongue 128 engages lower groove lips 134 and 234 of mounting plates 104 and 204, respectively, and a tension member 140 such as a spring may be provided to prevent movement or rattling between mounting assembly 120 and plate 104 and 204.

The helmet mount assembly 112 includes a sliding plate 152 which slides vertically with respect to the vertical adjust plate 160. The sliding plate 152 is slidably received over locking rails 162 disposed on the plate 160. A cover plate 146 is secured to the open end of the sliding plate 152 to prevent debris from entering the space between the sliding plate 152 and the vertical adjustment plate 160, which may interfere with the sliding movement of the plates 152 and 160 of the helmet mount assembly 112. The sliding plate 152 is selectively positionable relative to the plate 160 to provide a vertical adjustment of the optical device relative to the eyes of the wearer and is described in greater detail below. Soft tipped set screws 409 may be provided on the pivot mechanism as described in greater below.

Figure 4A:
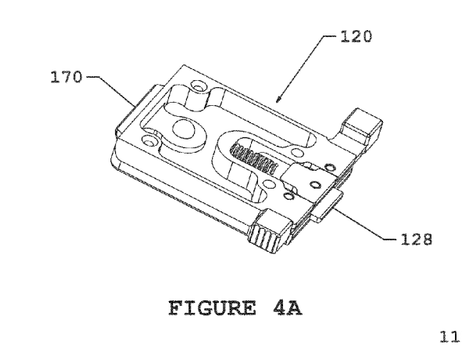
FIG. 4A illustrates a non-breakaway interface base according to an embodiment of the present invention.
Figure 4B:
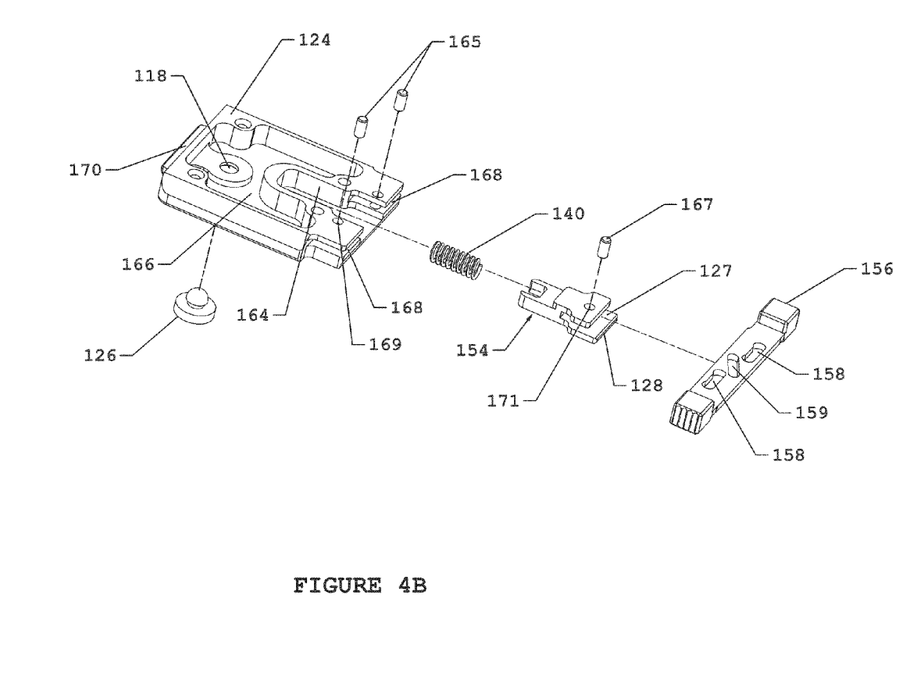
FIG. 4B is an exploded view illustrating the non-breakaway interface base shown in FIG. 4A.

Referring now to FIGS. 4A and 4B, there is shown the helmet interface assembly 120 for securing the pivoting helmet mount 112 to the helmet 108 via the connection plate assembly 104 (FIG. 1) or 204 (FIG. 2). The helmet mount assembly 120 has an interface base member 124 with a first channel 164, a second channel 166 and recesses 168. The first channel 164 receives a tension member 140, such as a captured spring, which is secured in the channel 164 by a locking tongue member 154. A first end of the locking tongue member 154 engages the tension member 140 and a second end includes a transverse groove or recess 127 and a locking tongue 128. An actuator bar 156 slides into recesses 168 of the interface base 124 and a recess 127 of the locking tongue member 154, thereby securing the tongue member 154 into the channel 164 in cooperation with pins 165 and 167 engaging aligned openings 169 and 171 in the base member 124 and locking tongue 154, respectively. The actuator bar 156 has elongated openings 158 engaging pins 165 and an elongated opening 159 engaging pin 167. The elongated openings 158 and 159 allow sliding movement of the actuator 156 and cooperates with the tension of member 140 to enable the locking tongue member 154 to be moved from an open position to a locked or engaged position wherein the locking tongue 128 protrudes out from the helmet interface assembly 120. The elongate openings 158 extend transversely and the pins 165 constrain the sliding movement of the actuator 156 to transverse movement. The opening 159 extends at an angle relative to the transverse openings 158. As the pin 167 runs in the angled opening 159, the tongue member 154 is selectively advanced and retracted. The ends of the elongate openings 158 may be slightly enlarged such that the spring tension will assist in retaining the actuator 156 in the selected one of the locked and unlocked positions.

When the locking tongue 128 is moved into its engaged position, the helmet interface assembly 120 can be secured to the connection plate assembly 104 or 204. FIG. 4A shows locking tongue 128 in the engaged position. To secure the mount assembly 120 to the plate assembly 104 or 204, a user would squeeze the actuator bar 156, e.g. against the urging of the tension member 140, insert protrusion 170 into the upper groove lip 135 or 235, press mounting assembly 120 into place on plate assembly 104 or 204, and then release actuator bar 156. When actuator bar 156 is released, the locking tongue 128 moves to its engaged position and engages the lower groove lip 134 or 234.

The second channel 166 contains an opening 118 for receiving a dampening member 126. The dampening member 126 may be a pad, grommet, or other flexible or resilient dampening member to decrease noise or vibration between the helmet interface assembly 120 and the connection plate assemblies 104 or 204. Other flexible or resilient dampening members may be provided at other points of contact as well.

The non-breakaway helmet interface assembly 120 may advantageously be selected in instances where it is desired to prevent inadvertent dislodging of an attached optical device from the helmet, e.g., where loss of the optical device is possible or where the operator may be subject to high accelerational or G forces.

Figures 5A, 5B:
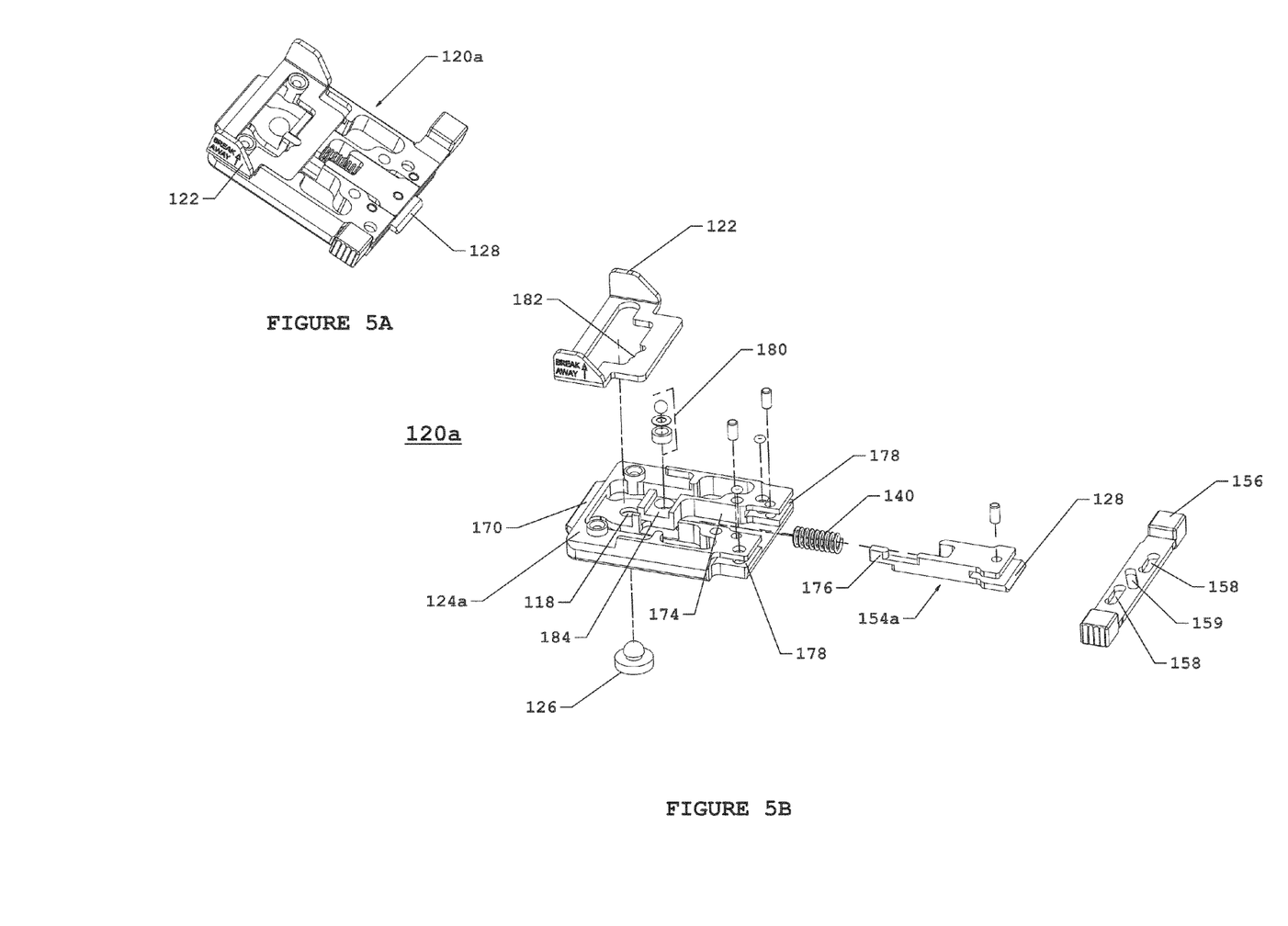
FIG. 5A illustrates a breakaway interface base according to an embodiment of the present invention.
FIG. 5B is an exploded view illustrating the breakaway interface base shown in FIG. 5A.

Referring now to FIGS. 5A and 5B, there is shown an alternative embodiment helmet interface assembly 120a with a breakaway actuator 122 enabling the pivoting helmet mount 112 to separate from the helmet interface assembly 120a when sufficient force is applied. The breakaway setting as shown in FIGS. 5A and 5B is advantageous in that it may prevent injury to the wearer in the event of entanglement or impact of the optical device.

The helmet mount assembly 120a has an interface base member 124a with a channel 174 and recesses 178. The channel 174 receives a tension member 140 which is secured in channel 164 by a locking tongue member 154a. An actuator bar 156 slides into recesses 178 and the recess of locking tongue 128 securing the tongue member 154a into channel 174. The actuator bar 156 has elongated openings 158 and 159. The openings 158 and 159 and the tension of member 140 enable the locking tongue member 154a to be moved from an open position to a locked or engaged position where locking tongue 128 protrudes out from the helmet interface assembly 120.

When the locking tongue 128 is moved into its engaged position the helmet interface assembly 120a can be secured to the connection plate assembly 104 or 204. FIG. 5A shows locking tongue 128 in the engaged position. To secure the mount assembly 120a to the plate assembly 104 or 204 a user would squeeze actuator bar 156, insert protrusion 170 into the upper groove lip 135 or 235, press mounting assembly 120a into place on plate assembly 104 or 204 and then release actuator bar 156. When actuator bar 156 is released, the locking tongue 128 moves to its engaged position and engages the lower groove lip 134 or 234.

In addition, the locking tongue member 154a has a tooth 176 for engaging a profiled or stepped groove 182 on the breakaway actuator 122. The breakaway actuator 122 is transversely slidable. When the breakaway actuator 122 is moved to lower step portion of the profile 182, the tongue 128 extends sufficiently far into the lower groove lip (134, 234) so as to provide a substantially rigid, nonbreakaway connection. When the tooth 176 engages the upper step portion of the profile 182, the tongue 128 is retracted slightly such that a ramped or inclined edge portion of the tongue 128 engages the lower groove lip (134, 234). The ramped surface allows further sliding movement of the tongue 128 against the urging of the spring 140 upon the application of a breakaway force. If sufficient force is applied, the breakaway actuator 122 will release from assembly 120a to prevent injury to the wearer.

The channel 174 also contains an opening 118 for a dampening member 126. The dampening member 126 may be a pad, grommet, or other flexible or resilient dampening member to decrease noise or vibration between the helmet interface assembly 120a and the connection plate assemblies 104 or 204. Other flexible or resilient dampening members may be provided at other points of contact as well. A ball detent assembly 180 sits within recess 184 of channel 174. The ball detent assembly 180 holds the breakaway actuator 122 within the channel 174 when tooth 176 is in the open position and no force is applied to the breakaway actuator 122.

Figures 6A, 6B:
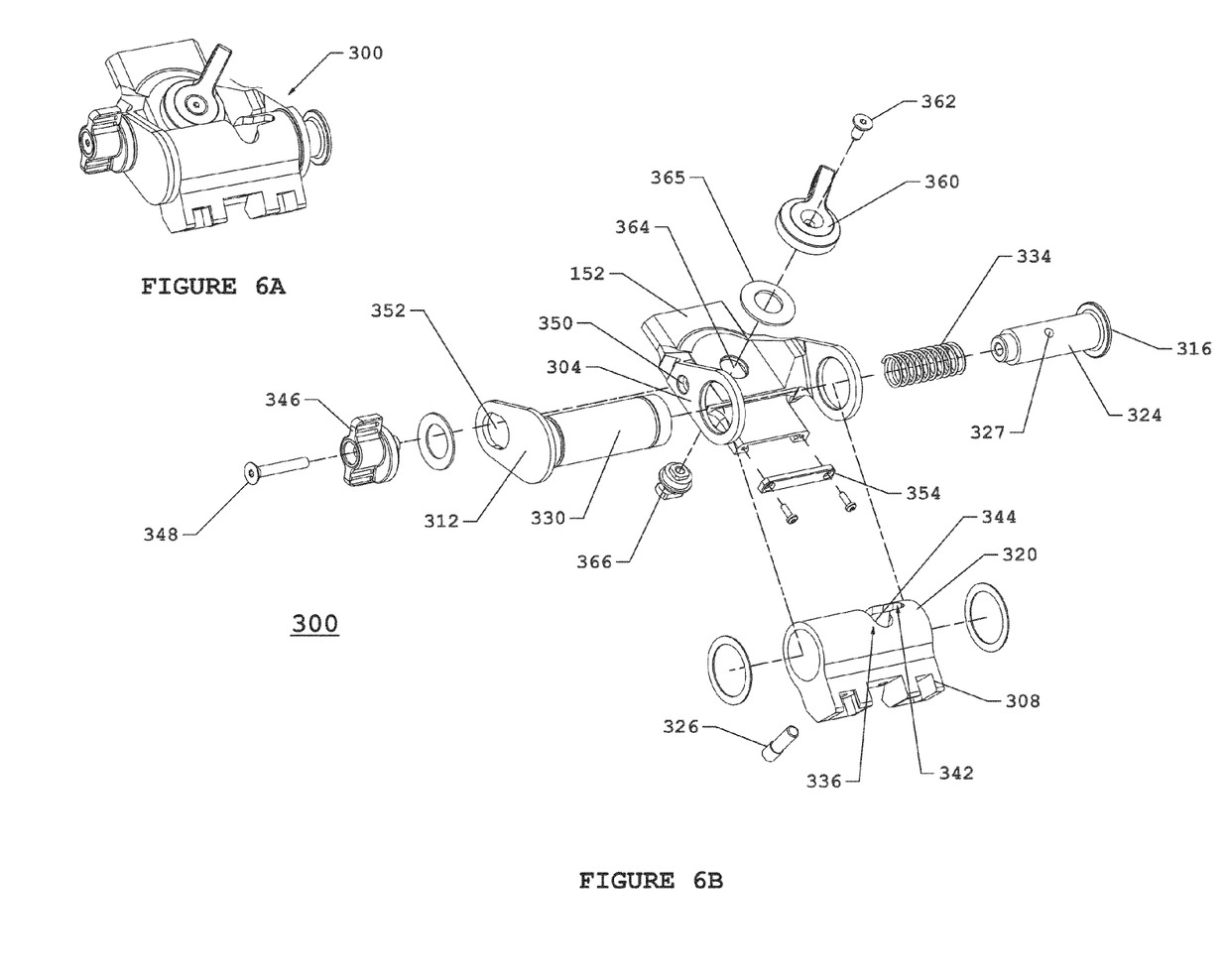
FIG. 6A illustrates a vertical adjustment mechanism according to an embodiment of the present invention.
FIG. 6B is an exploded view illustrating the vertical adjustment mechanism shown in FIG. 6A.

As can best be seen in FIGS. 6A and 6B, there is shown the vertical adjustment assembly 300 having a first pivot arm 304, a second pivot arm 308 and a pivot pin assembly 316. The second pivot arm 308 is pivotally attached to the first pivot arm 304. The second pivot arm 308 includes an outer, generally cylindrical sleeve 320 which rotates with respect to a pivot pin assembly 316. The pivot pin assembly 316 includes a central rod 324 coaxial with the pivot axis and carrying a protruding pin 326 received within opening 327. A generally cylindrical sleeve or bushing 330 is coaxially disposed intermediate the sleeve 320 and the axial rod 324. The bushing 330 includes an elongated slot 332 through which the pin 326 extends. The central rod 324 is movable in the axial direction against the urging of a captured coaxial spring 334 whereby the pin 326 may travel within the slot 332. Soft-tipped set screws 409, which may be e.g., brass, stainless steel or other metal set screws having nylon or other soft tips, may be received within threaded openings on the pivot arm 308 and may be selectively advanced to bear against the sleeve 330 to reduce maintain a relatively tight or rattle free fit between the pivot arm 308 and the sleeve 330. For example, the set screws 409 may be tightened as necessary to compensate for any looseness in the pivot mechanism as may occur over time through wear.

The outer sleeve 320 further includes a generally U-shaped slot 336 into which the pin 326 extends. The U-shaped slot 336 includes a rear axially extending leg 340, a front axially extending leg 342, and a base 344 extending in the radial direction between the legs 340 and 342. The pin 326 engages the rear leg portion 340 of the U-shaped slot 336 when the optical device (not shown) is in the operational position. Manually depressing the central rod 324 and allowing the arm 308 to pivot with respect to the arm 304. Upon pivoting the unit and releasing the rod 324, the pin 326 travels to the front leg 342 whereby the optical device is retained in a flipped-up position. In a preferred embodiment, the elongated slot 332 and the legs 340 and 342 are tapered such that they widen toward the base 344 to provide a wedging action on the pin 326 and to provide ease of operation during the pivoting operation.

An angle or tilt adjustment knob 346 includes a threaded rod 348 rotatably engaging a mating threaded opening 350 in the pivot arm 304. The arm 304 rotates relative to plate 312, which includes an elongate or curvate opening or slot 352 receiving the threaded rod 348. Loosening the knob 346 allows adjustment of the optics to a desired tilt angle according to the user's eye position and a desired line of sight, whereby the tilt angle may then be secured in the desired position by tightening the knob 346.

A vertical adjustment lever 360 includes a threaded screw 362 which travels through an opening 364 and engages a cam lock 366. A spring washer, e.g., a Belleville spring washer, is interposed between the lever 360 and the central chassis 152, which is compressed to provide a locking tension when the lever 360 is pivoted to the locked position and uncompressed when the lever is in the unlocked position. The cam lock 366 interfaces with the vertical adjustment plate 160 of a helmet interface assembly 120.

When the lever 360 is in the unlocked position, the elongate dimension of the cam lock 364 extends parallel to the channel defined between the parallel rails 162 allowing the assembly 152 to slide freely up and down to provide an infinitely adjustable vertical adjustment mechanism. In addition, the tension is released in the spring washer 365, allowing the cam lock 364 to move slightly upward. When the assembly 152 is at a desired vertical position relative to the plate 160 (e.g., when an attached viewing device is at the correct vertical position relative to the eyes of the user, the lever 360 is pivoted to the locked position.

When the lever 360 is turned to the locked position, the cam lock 366 interacts with the locking rails 162 of plate 160 securing the vertical adjustment assembly 300 in the desired position. In the depicted preferred embodiment, the cam lock 36 has ears 367 extending in the elongate direction of the cam lock 364. The rails 162 cooperate with the plate 160 to define a generally T-shaped channel. The rails 162 may include a ramped or beveled edge to facilitate sliding movement of the ears 367 into the T channel as the lever 360 is rotated to the locked position. As the cam lock 364 is rotated, the ramped surface of the T channel draws the cam lock 364 downward, compressing the spring washer 367 and thus providing a tensioning force to secure the lever 360 in the locked position. As an alternative to or in addition to the ramped surface of the T channel defined by the rails 162, the ears 367 could also be ramped or beveled to facilitate movement into the T-channel as the lever 360 is pivoted to the locked position.

Movement of the vertical adjustment assembly 300 enables adjustment of the vertical position of an optical device relative to the wear's eye position and desired line of sight. Once a desired vertical position is located, the lever 360 is moved back to a locked position and the cam lock 366 engages with locking rails 162 preventing vertical movement of the assembly 300.

Figure 7:
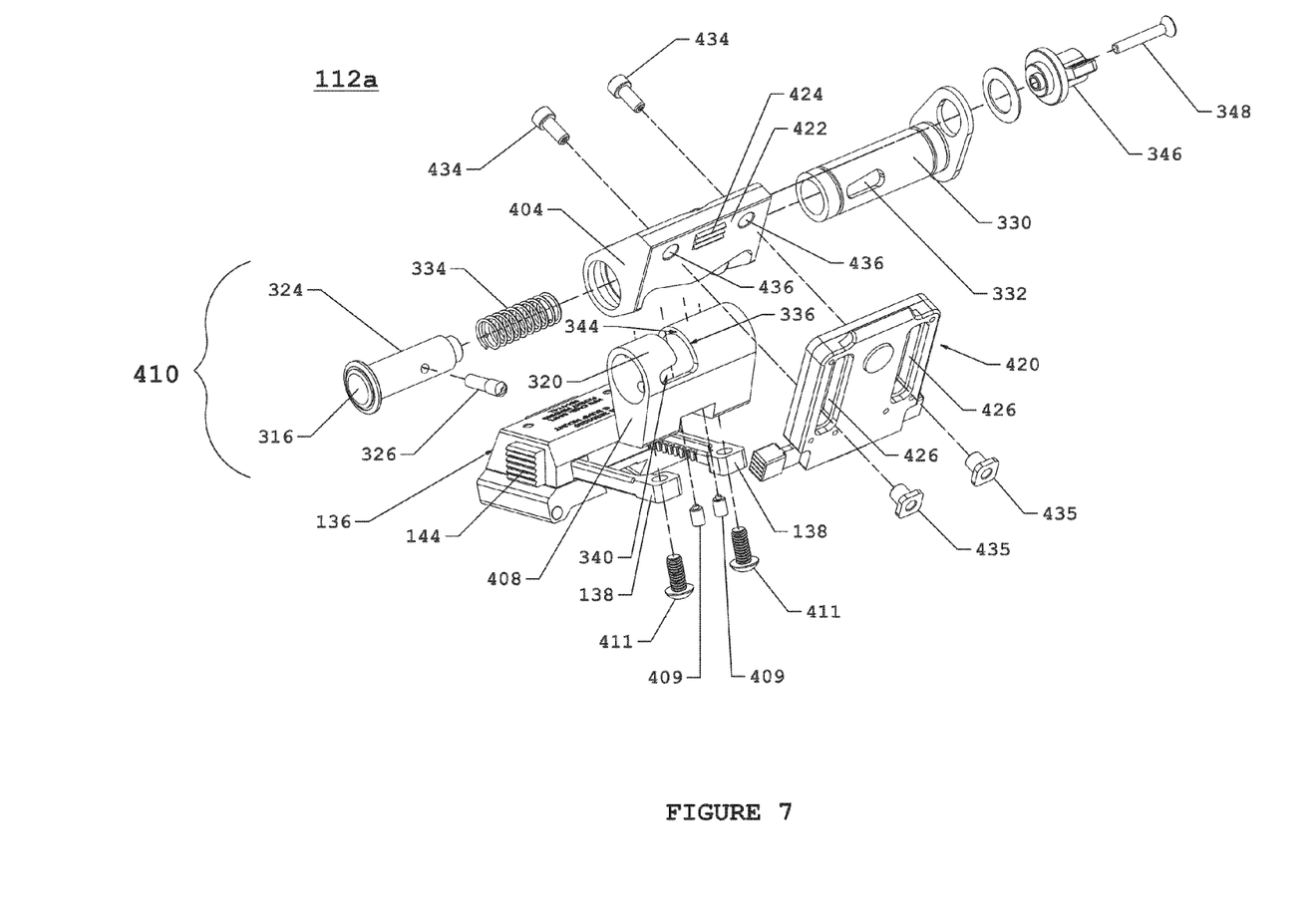
FIG. 7 is a partially exploded rear perspective view of a manually locked vertical adjustment mechanism according to an alternative embodiment of the present invention.
Figure 8:
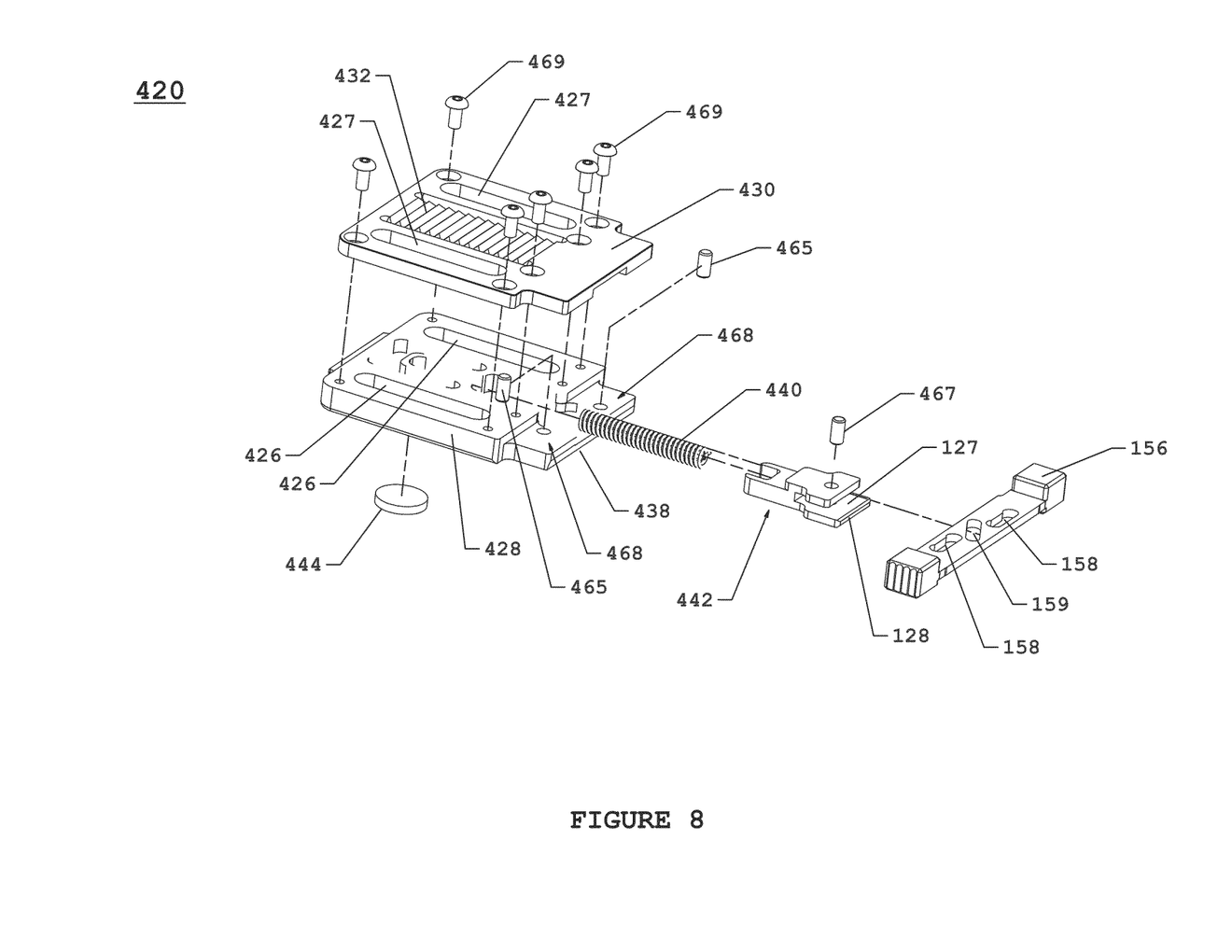
FIG. 8 is an exploded view illustrating a serrated interface base according to an alternative embodiment of the present invention.

Referring now to FIGS. 7 and 8, there is shown an alternative embodiment pivoting helmet mount assembly 112a including a manually set and lock helmet interface assembly 420, described in greater detail below, secured to a first pivot arm 404 of a pivoting helmet mount 410. The first pivot arm 404 is pivotally attached to a second pivot arm 408. The first pivot arm 404 includes a back member 422 having locking serrations or teeth 424.

The helmet interface assembly 420 is comprised of a lower interface base 428 and an upper serrated plate 430. When the lower interface base 428 is secured to the upper serrated plate 430, locking screw slots 426 are created. The locking serrations 424 of the back member 422 intermesh with the locking serrations 432 of the upper serrated plate 430 when the helmet interface assembly 420 is secured to the pivoting helmet mount 410. The pivoting helmet mount 410 is secured to the helmet interface assembly using locking screws 434. The locking screws 434 travel through openings 436 and slots 426 and are secured to threaded T-nuts received in the slots 426. A desired vertical position of the optical device attached to the pivoting helmet mount 410 is selected by positioning the teeth 424 at a desired position along the upper serrated plate 430. The device will remain at the selected vertical position unless and until the user loosens or removes the locking screws 434 and repositions the vertical position on the helmet interface assembly 420.

The second pivot arm 408 includes an outer, generally cylindrical sleeve 320 which rotates with respect to a pivot pin assembly 316. The pivot pin assembly 316 includes a central rod 324 coaxial with the pivot axis and carrying a protruding pin 326. A generally cylindrical sleeve or bushing 330 is coaxially disposed intermediate the sleeve 320 and the axial rod 324. The bushing 330 includes an elongated slot 332 through which the pin 326 extends. The central rod 324 is movable in the axial direction against the urging of a captured coaxial spring 334 whereby the pin 326 may travel within the slot 332.

The outer sleeve 320 further includes a generally U-shaped slot 336 into which the pin 326 extends. The U-shaped slot 336 includes a rear axially extending leg 340, a front axially extending leg 342, and a base 344 extending in the radial direction between the legs 340 and 342. The pin 326 engages the rear leg portion 340 of the U-shaped slot 336 when the optical device is in the operational position. Manually depressing the central rod 324 allows the arm 308 to pivot with respect to the arm 304. Upon pivoting the unit and releasing the rod 324, the pin 326 travels to the front leg 342 whereby the optical device is retained in a flipped-up position. In a preferred embodiment, the elongated slot 332 and the legs 340 and 342 are tapered such that they widen toward the base 344 to provide a wedging action on the pin 326 and to provide ease of operation during the pivoting operation.

Figure 9:
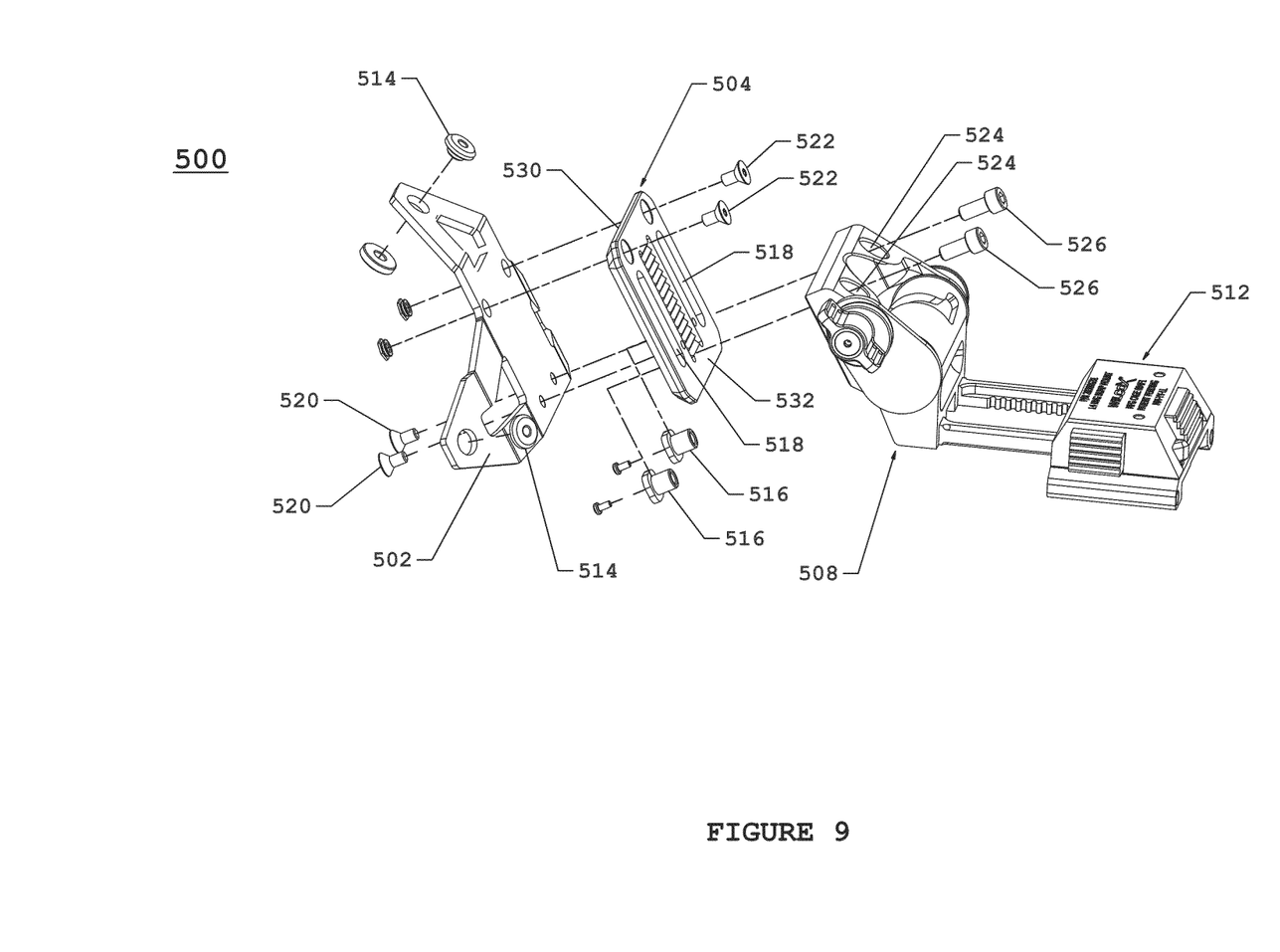
FIG. 9 is a partially exploded view illustrating a generally permanently attached helmet mounting system according to a third exemplary embodiment.

The second pivot arm 408 of interface base 410 attaches to a pair of rails 138 extending in the horizontal position (when the helmet is worn by a user and the optical device is in the operation, i.e., flipped down, position). A sliding carriage 136 is movable along the slide rails 138 to allow the user to horizontally position the optical device at a comfortable or desired focal distance from the operator's eyes. At least one of the slide rails 138 (both in the depicted embodiment as seen in FIGS. 3, 7, and 9) contain a series of locking teeth 142 along its length for engaging an internal locking member such as a toothed member, pin, or the like, to provide secure retention at a selected position. Release buttons 144, biased toward the locked position, may be manually depressed to disengage the locking members to allow sliding movement of the carriage 136 until the optics are positioned at a desired focal position in front of the user's eye(s). Threaded fasteners 411 secure the slide rails 138 to the second pivot arm 408.

FIG. 8 shows an exploded view of the manually set and lock helmet interface assembly 420 of the pivoting helmet mount 112a shown in FIG. 7. The helmet mount assembly 420 has a lower interface base 428 and an upper serrated plate 430. The lower interface base 428 has a center channel 438 and two locking screw slots 426. The center channel 438 receives a tension member 440 which is secured in channel 438 by a locking tongue member 442. A first end of the locking tongue member engages the tension member 440 and a second end includes a channel 127 and a tongue 128. An actuator bar 156 slides into the recess 127 of locking tongue member 442 as well as transversely disposed recesses 468 which are created when the lower interface base 428 and the upper serrated plate 430 are secured together via threaded fasteners 469. The actuator bar 156 has elongated openings 158 and 159 receiving pins 465 and 467, respectively. The openings 158 and 159, and the tension of member 440 enable the locking tongue member 442 to be moved from an open position to a locked or engaged position where the locking tongue 128 protrudes out from the helmet interface assembly 420.

When the locking tongue 128 is moved into its engaged position, the helmet interface assembly 420 can be secured to the connection plate assembly 104 or 204. To secure the mount assembly 420 to the plate assembly 104 or 204 a user would squeeze actuator bar 156, e.g., to compress the tension member 440, insert protrusion 170 into the upper groove lip 135 or 235, press mounting assembly 420 into place on plate assembly 104 or 204, and then release actuator bar 156. When the actuator bar 156 is released, the locking tongue 128 moves to its engaged position and engages the lower groove lip 134 or 234.

The upper serrated plate 430 also has two locking screw slots 427, which aligned with the slots 426, as well as locking serrations or teeth 432. The upper serrated plate 430 provides a cover for the internal locking mechanism which includes the tension member 440, the locking tongue member 442, and the actuator bar 156. The locking serrations 432 on the upper serrated plate 430 mate with the locking teeth 424 on the first pivot arm 404 at a desired position therealong to provide a correct alignment of an attached optical device with the eye or eyes of the user, as described above. It is also contemplated that the locking serrations 424 could also be used to enable the user to mount other devices, such as flashlights and cameras, to the secured helmet interface assembly 420.

The back of lower interface base 428 may also include a dampening member 444. The dampening member 444 may be a pad, grommet, or other flexible or resilient dampening member to decrease noise or vibration between the helmet interface assembly 420 and the connection plate assemblies 104 or 204.

Referring now to FIG. 9, there is shown a further embodiment helmet mount 500, including a connection plate assembly 502, a helmet interface assembly 504, a vertical adjustment assembly 508, and a sliding carriage 512. Prior to securing the connection plate assembly 502 to a helmet (not shown) the helmet interface assembly 504 is first secured to the connection plate assembly 502. As the interface assembly 504 is being secured to the plate assembly 502, threaded grommets 516 are inserted through the lower interface base 530 into each of the locking screw slots 518. Once the threaded grommets 516 are in place, the helmet interface assembly 504 can be secured to the plate assembly 502 via threaded fasteners 520 and 522. After the helmet interface assembly 504 is secured to the plate assembly 502, the plate assembly 502 may be secured to the helmet (not shown) via three threaded fasteners 514.

The vertical adjustment assembly 508 is then positioned to the desired vertical position and secured via locking screws 526 to the plate assembly 502 and interface assembly 504. Complimentary locking teeth (not visible in FIG. 9) may be provided on the rearward facing surface of the member 508, as described above, to intermesh at a desired vertical position on the serrated plate 532. The locking screws 526 pass through the openings 524 in the adjustment assembly 508, through the elongate locking screw slots 518 and are screwed into the threaded grommets 516, thereby locking the vertical adjustment assembly 508 into the desired position. If the user wants to adjust the vertical alignment of the optical device attached to the helmet mounting system 500 he will have to remove locking screws 526, readjust the position, and reinsert the locking screws 526.

Figure 10:
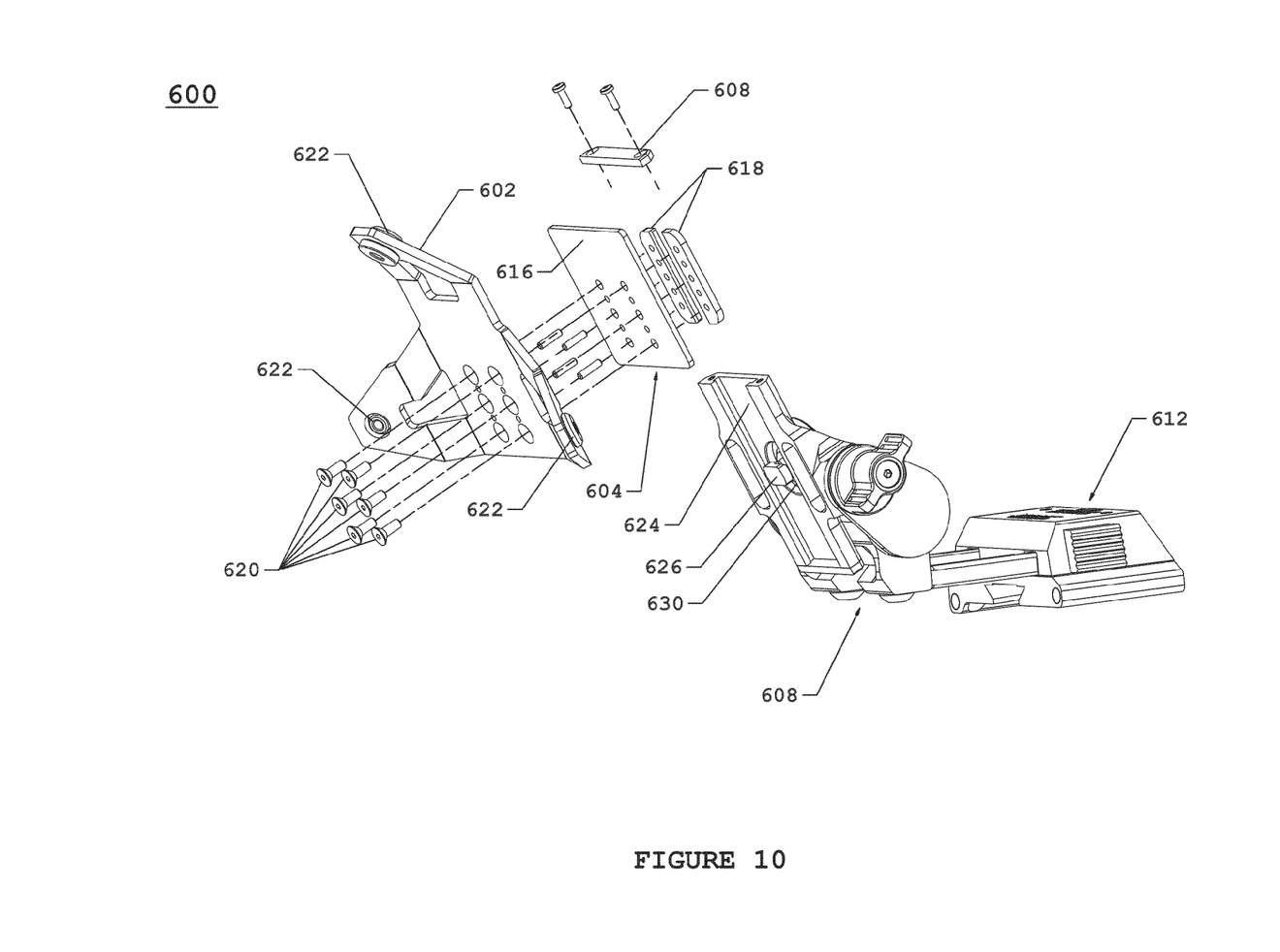
FIG. 10 is a partially exploded view illustrating a generally permanently attached helmet mounting system according to a fourth exemplary embodiment.

Referring now to FIG. 10, there is shown a further embodiment helmet mount 600, including a connection plate assembly 602, a helmet interface assembly 604, a vertical adjustment assembly 608, and a sliding carriage 612. The helmet interface assembly has a base plate 616 and locking rails 618. The base plate 616 and locking rails 618 are secured to the connection plate assembly 602 via threaded fasteners 620. Once the helmet interface assembly 604 has been secured to the plate assembly 602, the plate assembly 602 is secured to a helmet (not shown) via three threaded fasteners 622.

The vertical adjustment assembly 608 may be as described above in reference to FIGS. 3, 6A, and 6B and now described in further detail. The vertical adjustment assembly 608 has a sliding plate 624 in which a cam lock 626 sits. When the cam lock 626 is in the release position the sliding plate 624 of the vertical adjustment assembly 608 is able to slide over locking rails 618. Once the vertical adjustment assembly 608 has been slid into place a cover 628 is secure to the top of the sliding plate 624 to prevent debris getting into the sliding plate 624 opening and interfering with vertical movement of the vertical adjustment assembly 608.

A vertical moving lever (not shown) travels through opening 630 and rotatably engages the cam lock 626. The cam lock 626 interfaces with the locking rails 618. When the lever is turned to the locked position, the cam lock 626 interacts with the locking rails 618 securing the vertical adjustment assembly 608 in the desired position. If the lever is moved to the released position, the cam lock 626 disengages from the locking rails 618 enabling the wearer to vertically move the vertical adjustment assembly 608. Once a desired vertical position is located the lever is moved back to a locked position and the cam lock 626 re-engages with locking rails 618 preventing vertical movement of the assembly 608.

Figure 11:
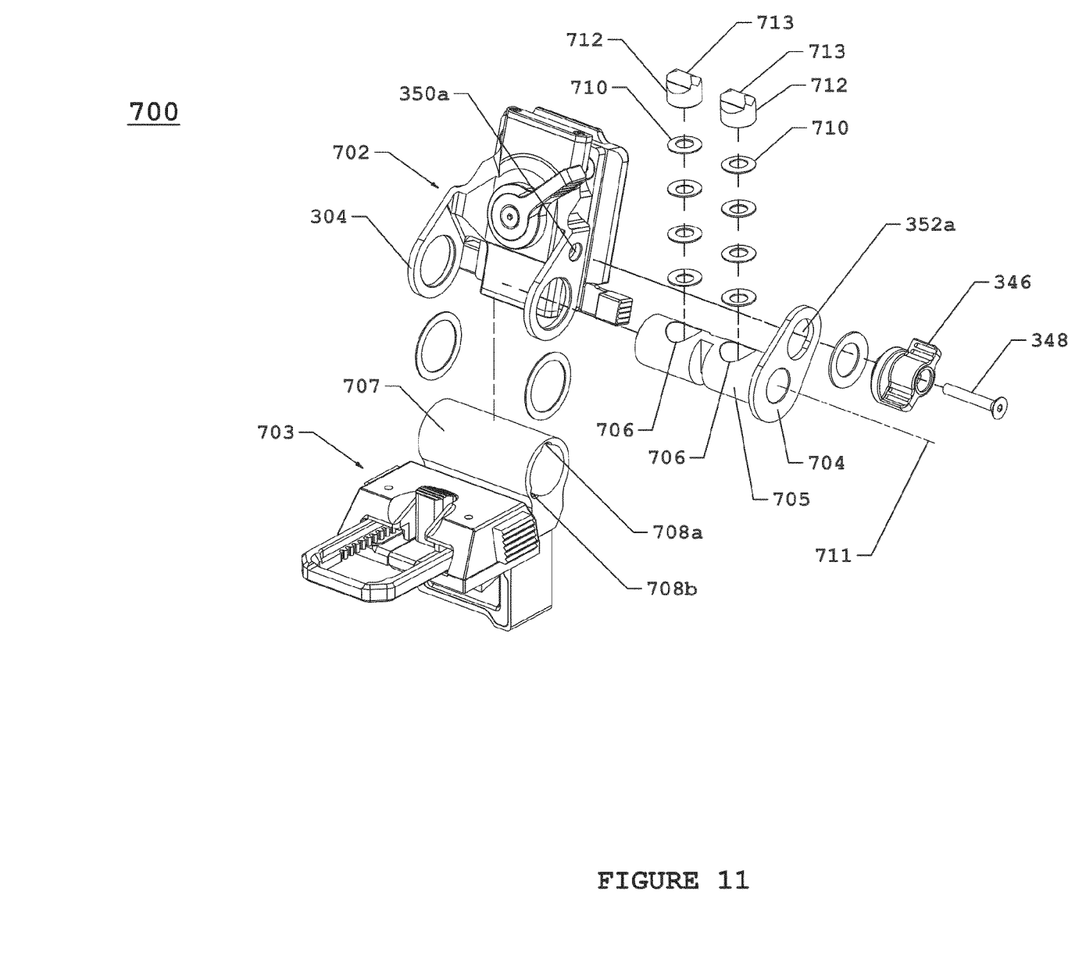
FIGS. 11, 12A, and 12B are partially exploded views illustrating a further helmet mount embodiment including a force to overcome mechanism for moving the viewing device between the viewing and stowed positions.
Figure 12A:
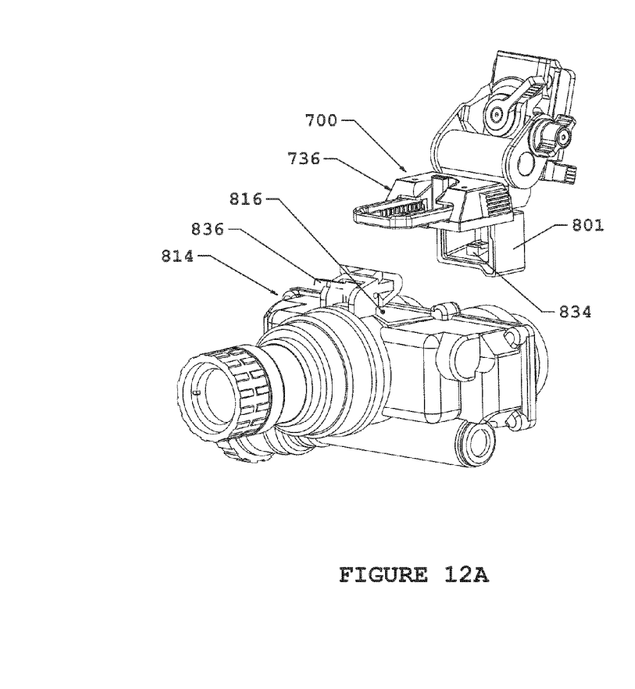
Figure 12B:
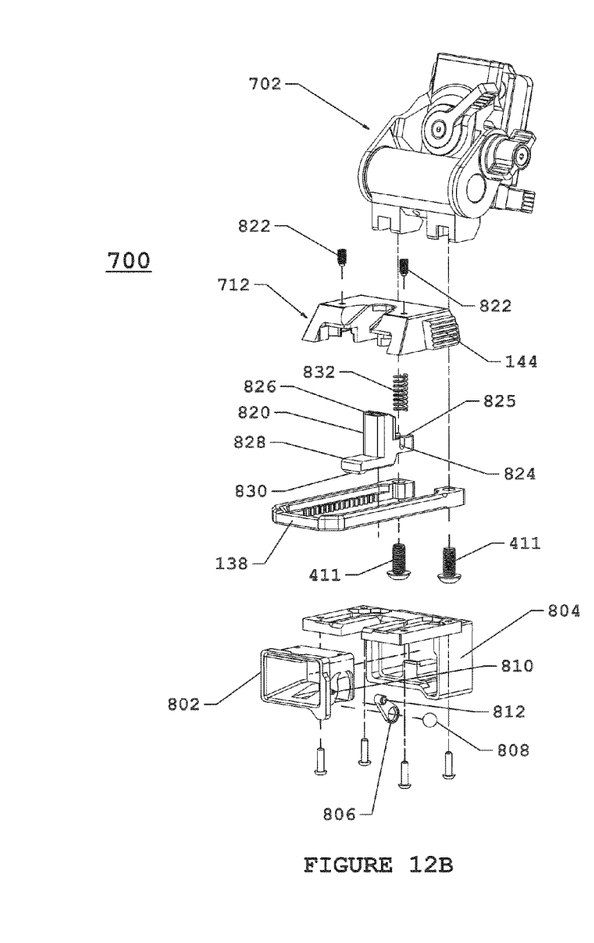

Referring now to FIGS. 11 and 12, there appears yet a further embodiment helmet mount 700, which includes a first pivoting segment 702 for attachment to the front of a helmet and a second pivoting segment 703 for attachment to a viewing device.

The first pivoting segment 702 may be substantially as described above, e.g., by way of reference to FIGS. 6A and 6B, except wherein the push button mechanism for moving the mount between the operative, viewing position, and the folded, stowed position has been replaced with a force-to-overcome mechanism. The first pivoting segment 702 depicted in FIGS. 11, 12A, and 12B is a non-breakaway mount, although in alternative embodiments, the embodiment of FIGS. 11, 12A, and 12B may modified to incorporate a breakaway feature as detailed above.

The force to overcome mechanism includes a pivot pin 705 extending through a transversely extending pivot sleeve 707 carried on the second pivoting segment 703. The sleeve 707 includes first and second transversely extending channels or grooves 708a and 708b. The pivot pin 705 also extends through openings in pivot arms 304 in the first pivoting segment to connect the first and second pivoting segments 702, 703 in hinged fashion.

The pivot pin 705 includes one or more bores 706 (two in the embodiment shown) extending transversely with respect to the pivot axis 711. Each of the bores 706 includes one or more (four in the embodiment shown) spring washers (e.g., wave disc springs, Belleville washers, curved disc springs, etc.) seated with the respective bore 706. Each bore includes a plug 712 seated over the wave springs to capture the wave springs with the bore 706. Each of the plugs 712 includes a radiused upper (in the orientation shown in FIG. 11) protrusion 713. The plugs 712 are sized such that the protrusions 713 will be urged upwardly and, absent any biasing force opposing the spring force of the spring washers 710 will stand proud of the outer surface of the pivot pin 705. The transverse sides of the protrusions 713 may be beveled to facilitate insertion of the pivot pin 705 carrying the plugs 712 into the sleeve 707. The pivot pin 705 does not rotate relative to the first pivoting segment 702 by virtue of the threaded rod 348 engaging opening 350a in the facing one of the arms 304. The rod 348 secures the tilt adjustment knob 346 engaging an elongate or eccentric opening 352a in pivot plate 704. The operation of the tilt adjust mechanism is as detailed above.

In operation, the second pivoting segment 703 is manually pivotable relative to the first pivoting segment 702 about the pivot pin 705. The second pivoting segment may be pivoted downward until the protrusions 713 engage the channel 708b formed in the inner wall of the sleeve 707. The spring washers 710 urge the protrusions 710 into the channel 708b to secure the mount in the operative deployed position wherein the associated goggle will be positioned in front of the eye(s) of the user. When it is desired to move the goggles to the stowed position, the wearer applies a pivoting force to the goggles. When the force applied is sufficient to overcome the spring force of the spring washers 710, the plugs 712 will be moved inwardly against the urging of the spring washers. The goggles may be pivoted upward until the protrusions 713 are aligned with the channel 708a at which time the spring washers 710 will urge the protrusions 713 into the channel 708a and provide positive retention of the goggles in the stowed position. In a preferred embodiment, the channels 708a and 708b have a first curved radius and the protrusions 713 have a second radius, wherein the radius of the protrusions 713 is slightly larger than the radius of the channels 708a, 708b.

Referring now to FIG. 12A, and with continued reference to FIGS. 11 and 12B, there appears an exemplary goggle device 814 having a mounting horn or foot 818, e.g., a generally tapered or pyramidical mounting horn or foot which is removably received within a complimentary mounting shoe 801 carried on the sliding carriage 736. The sliding carriage 736 is slidable received on a sliding arm 138 which, in turn, is secured to the upper carriage portion 712 via threaded fasteners 411. The upper carriage portion 736 includes a button 144 which allows the carriage to slide fore and aft along the sliding rail arm 138 when the button 144 is depressed to adjust the viewing device 814 to a desired focal distance in front of the eyes of the viewer. Soft-tipped set screw 822 may be provided in the upper carriage housing 712, received in threaded openings therein and bearing against the rail 138. The set screws 822 may be selectively tightened as necessary to prevent rattling or looseness between the sliding carriage and the rails, for example, as may occur over time through wear.

As best seen in FIG. 12B, the mounting shoe 801 includes an outer housing 804 and an inner housing 802. The inner housing 802 defines a cavity for receiving the horn 818. The horn 818 includes a locking/unlocking lever 836 which engages a complimentary latch 834 within the shoe 801. For example, the lever 836 may be a spring biased lever engaging, for example, a protrusion on the latch member 834. Manipulation of the lever 836 by depressing the lever 836 against the bias of the biasing spring (not shown) releases the lever 836 from the latch member 834 allowing removal of the horn 818 from the shoe 801. The inner and outer housing members 801, 804 are preferably formed of a nonmagnetically attractive material, such as aluminum, plastic, etc.

Because the carriage member 736 may obscure direct manual access to the locking/unlocking lever 836 provided on the device 814, an actuator 820 for actuating the lever 836 may be provided on the carriage member 836. In the illustrated embodiment, a release actuator 820 includes a manual button portion 826 and is pivotally attached to the upper carriage member 712 about a pivot axis 824. A spring 832 is captured between a spring seat portion 825 on the actuator 820 and the upper carriage housing 824. The actuator 820 also includes a cantilevered arm 828 with a downward extending (in the depicted orientation) tooth 830. The tooth 830 engages the lever 836 on the device 814. Upon depression/pivoting of the actuator 826 against the bias of the spring 830, the tooth 830 on the cantilevered arm 828 depresses the lever 836, thus disengaging the lever 836 from the latch 834 and allowing removal of the horn 818 from the shoe 801.

A magnet pivot arm 806 carrying a magnet 808 is disposed between the inner mounting shoe housing 802 and the outer mounting shoe housing 804. The magnet 808 may be a spherical magnet, and is preferably a rare earth magnet, although other ferrite or ceramic magnet types are also contemplated. The arm includes an opening 812 pivotally receiving a pivot pin or post 810, such that the arm 806 may swing under the influence of gravity within the space defined between the inner and outer housing sections 802 and 804, respectively. In operation, the arm 812 swings under the influence of gravity so that when the second pivoting segment is moved to the viewing position, the magnet moves downward to a position adjacent a reed switch, Hall effect sensor, or other magnetic proximity sensor 816 on the viewing device 814. When the magnet is in proximity with the reed switch or like switch or sensor, the unit 814 is powered on. When the second pivoting segment is moved to upward to the stowed position, the magnet swings under the influence of gravity away from the switch/sensor 816. When the magnet is out of proximity with the reed switch or like switch or sensor, the unit 814 is powered off. In this manner, the unit 814 is automatically powered off when the mount is moved to the stowed position, thereby conserving battery life of the unit 814.

The invention has been described with reference to the preferred embodiments. Modifications and alterations will occur to others upon a reading and understanding of the preceding detailed description. It is intended that the invention be construed as including these and other modifications and alterations. All references cited herein are incorporated herein by reference in their entireties.

Having thus described the preferred embodiments, the invention is now claimed to be:

1. A helmet mount for mounting an associated viewing device on a helmet, comprising:
    a first pivoting segment for attachment to the helmet;
    a second pivoting segment for attachment to the associated viewing device, the second pivoting segment pivotable relative to the first pivoting segment for selectively supporting the associated viewing device in a first, operational position before the eyes of a user donning the helmet and a second, stowed position above a line of sight of a viewer donning the helmet;
    said first pivoting segment including a vertical adjust mechanism, said vertical adjust mechanism including a base plate, a pair of locking rails attached to said base plate and defining a channel therebetween, a sliding plate slidably attached to said locking rails, and a clamping mechanism for selectively applying a clamping force to secure said sliding plate at a desired position relative to said base plate; and,
    said clamping mechanism including:
        a lever manually pivotable between a first, locked position and a second, unlocked position;
        a spring washer disposed between said lever and said sliding plate;
        a cam lock attached to said lever and extending through an opening in said sliding plate, said cam lock received within said channel;
        said locking rails cooperating with said base portion to define a pair of grooves formed in opposing walls of said channel;
        said cam lock having an elongate cam member wherein a long dimension of the cam lock extends parallel to said channel when the lever is in the unlocked position, whereby said cam lock does not extend into said grooves and is freely slidable;
        said locking rails having a chamfered surface for camming said cam member into said grooves against the urging of said spring washer to compress the spring washer and thereby provide a clamping force between the base plate and the sliding plate when the lever is rotated to the locked position.

2. The helmet mount of claim 1, wherein said vertical adjustment mechanism is continuously adjustable.

3. The helmet mount of claim 1, wherein each of said locking rails is slidably received within a complimentary groove formed in said sliding plate.

4. The helmet mount of claim 1, further comprising:
    a viewing device mounting member attached to said second pivoting segment, said viewing device mounting member removably attachable to the associated viewing device.

5. The helmet mount of claim 4, further comprising:
    said second pivoting segment including said viewing device mounting member slidably mounted thereon; and
    a locking and unlocking mechanism for selectively locking said viewing device mounting member at a desired position along said second pivoting segment to provide a generally horizontal fore and aft adjustment of the associated viewing device relative to the eyes of a user when the mounting device is in an operational position.

6. The helmet mount of claim 4, further comprising:
    a tilt adjustment mechanism for adjusting a tilt position of the associated viewing device relative to an eye of a user.

* * * * *